US010932296B2

(12) United States Patent
Wu et al.

(10) Patent No.: US 10,932,296 B2
(45) Date of Patent: Feb. 23, 2021

(54) DEVICE AND METHOD OF HANDLING PHYSICAL RANDOM ACCESS CHANNEL RESOURCES ON A SECONDARY CELL IN CARRIER AGGREGATION

(71) Applicant: HTC Corporation, Taoyuan (TW)

(72) Inventors: Chih-Hsiang Wu, Taoyuan (TW); Ling-San Meng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 97 days.

(21) Appl. No.: 16/055,182

(22) Filed: Aug. 6, 2018

(65) Prior Publication Data

US 2019/0045551 A1 Feb. 7, 2019

Related U.S. Application Data

(60) Provisional application No. 62/541,795, filed on Aug. 7, 2017.

(51) Int. Cl.
*H04W 74/08* (2009.01)
*H04W 28/06* (2009.01)
(Continued)

(52) U.S. Cl.
CPC ...... *H04W 74/0833* (2013.01); *H04B 7/0695* (2013.01); *H04L 5/0048* (2013.01);
(Continued)

(58) Field of Classification Search
CPC . H04W 74/0833; H04W 76/27; H04W 16/28; H04W 28/065; H04W 72/042; H04L 5/0048; H04L 5/0053
See application file for complete search history.

(56) References Cited

U.S. PATENT DOCUMENTS

| 2015/0327218 A1 | 11/2015 | Kim | |
|---|---|---|---|
| 2018/0063736 A1* | 3/2018 | Sadeghi | H04W 24/10 |
| 2019/0104549 A1* | 4/2019 | Deng | H04B 7/0617 |

FOREIGN PATENT DOCUMENTS

| CN | 101540978 A | 9/2009 |
|---|---|---|
| CN | 104186021 A | 12/2014 |

(Continued)

OTHER PUBLICATIONS

Onggosanusi et al. "Modular and High-Resolution Channel State Information and Beam Management for 5G New Radio" IEEE Communications Magazine Mar. 2018 (Year: 2018).*

(Continued)

*Primary Examiner* — Jeffrey M Rutkowski
*Assistant Examiner* — Basil Ma
(74) *Attorney, Agent, or Firm* — Winston Hsu

(57) ABSTRACT

A base station (BS) for handling Physical Random Access Channel (PRACH) resources on a SCell in carrier aggregation comprises at least one storage device storing instructions of transmitting a radio resource control (RRC) message configuring the SCell to a communication device, wherein the RRC message comprises a DL beam management (BM) reference signal (RS) configuration and an association between a plurality of PRACH resources and a plurality of DL Tx beams; transmitting a plurality of DL BM RSs by using the plurality of DL Tx beams on the SCell, respectively; receiving a measurement report of the plurality of DL BM RSs; determining a DL Tx beam according to the measurement report; transmitting a Physical DL Control Channel (PDCCH) order by using the DL Tx beam, wherein the PDCCH order comprises a PRACH mask index indicating at least one PRACH resource; and determining a PRACH resource according to the measurement report.

14 Claims, 6 Drawing Sheets

(51) Int. Cl.
    *H04W 16/28*     (2009.01)
    *H04W 72/04*     (2009.01)
    *H04L 5/00*     (2006.01)
    *H04W 76/27*     (2018.01)
    *H04B 7/06*     (2006.01)
    *H04W 74/00*     (2009.01)

(52) U.S. Cl.
    CPC ........... *H04L 5/0053* (2013.01); *H04W 16/28* (2013.01); *H04W 28/065* (2013.01); *H04W 72/042* (2013.01); *H04W 74/006* (2013.01); *H04W 76/27* (2018.02); *H04L 5/0023* (2013.01); *H04L 5/0094* (2013.01)

(56) References Cited

FOREIGN PATENT DOCUMENTS

WO     2016/077701 A1     5/2016
WO     2016/086144 A1     6/2016

OTHER PUBLICATIONS

Office action dated May 23, 2019 for the Taiwan application No. 107127346, filing date Aug. 7, 2018, pp. 1-11.
Search Report dated Dec. 7, 2018 for EP application No. 18187569. 1, pp. 14.
3GPP TS 36.211 V14.0.0, Sep. 2016.
3GPP TS 36.212 V14.0.0, Sep. 2016.
3GPP TS 36.213 V14.0.0, Sep. 2016.
Office action dated Dec. 3, 2020 for the China application No. 201810892881.0, filed Aug. 7, 2018, pp. 1-5.

\* cited by examiner

DEVICE AND METHOD OF HANDLING PHYSICAL RANDOM ACCESS CHANNEL RESOURCES ON A SECONDARY CELL IN CARRIER AGGREGATION

CROSS REFERENCE TO RELATED APPLICATIONS

This application claims the benefits of U.S. Provisional Application No. 62/541,795 filed on Aug. 7, 2017, which is incorporated herein by reference.

BACKGROUND OF THE INVENTION

1. Field of the Invention

The present invention relates to a device and a method used in a wireless communication system, and more particularly, to a device and a method of handling Physical Random Access Channel (PRACH) resources on a secondary cell (SCell) in carrier aggregation (CA).

2. Description of the Prior Art

A new radio (NR) system, developed recently in the 3rd generation partnership project (3GPP), is regarded as a NR interface and radio network architecture that provides a high data rate, a low latency, a packet optimization, and an improved system capacity and coverage.

SUMMARY OF THE INVENTION

The present invention therefore provides a communication device and method for handling Physical Random Access Channel (PRACH) resources on a secondary cell (SCell) in carrier aggregation (CA) to solve the abovementioned problem.

A base station (BS) for PRACH resources on a SCell for a communication device in CA comprises at least one storage device; and at least one processing circuit, coupled to the at least one storage device, wherein the at least one storage device stores, and the at least one processing circuit is configured to execute instructions of transmitting a radio resource control (RRC) message configuring the SCell to the communication device, wherein the RRC message comprises a PRACH resources configuration for the SCell, a downlink (DL) beam management (BM) reference signal (RS) configuration for the SCell and an association between a plurality of PRACH resources and a plurality of DL transmission (Tx) beams; transmitting a plurality of DL BM RSs to the communication device by using the plurality of DL Tx beams on the SCell, respectively, according to the DL BM RS configuration; receiving a measurement report of the plurality of DL BM RSs from the communication device on a primary cell (PCell); determining a DL Tx beam of the plurality of DL Tx beams according to the measurement report; transmitting a Physical DL Control Channel (PDCCH) order to the communication device by using the DL Tx beam, wherein the PDCCH order comprises a PRACH mask index indicating at least one PRACH resource of the plurality of PRACH resources; and determining a PRACH resource indicated in the PDCCH order to the communication device according to the measurement report and the association.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
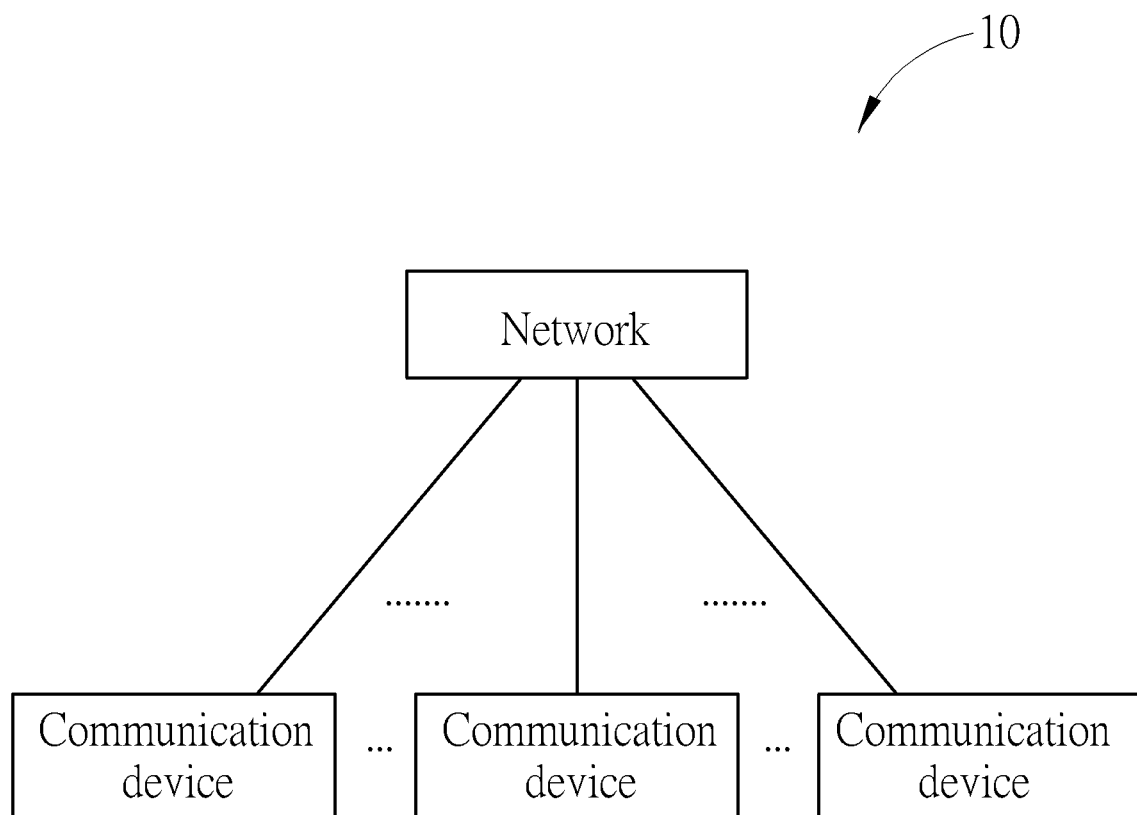
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may communicate with each other via one or multiple cells (e.g., multiple carriers) belonging to one or multiple base stations (BSs). The abovementioned cells may be operated in the same or different duplexing modes, i.e., frequency-division duplexing (FDD), time-division duplexing (TDD) or flexible duplexing.

In FIG. 1, the network and the communication devices are simply utilized for illustrating the structure of the wireless communication system 10. The network may include a radio access network (RAN) and a core network (CN). The RAN may include at least one base station. The RAN may comprise a new radio (NR) RAN (or called a fifth generation (5G) RAN or next generation (NG) RAN), evolved NR RAN or a sixth generation (6G) RAN. The CN may be a 5G core (5GC) network, an evolved 5GC or 6G core.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
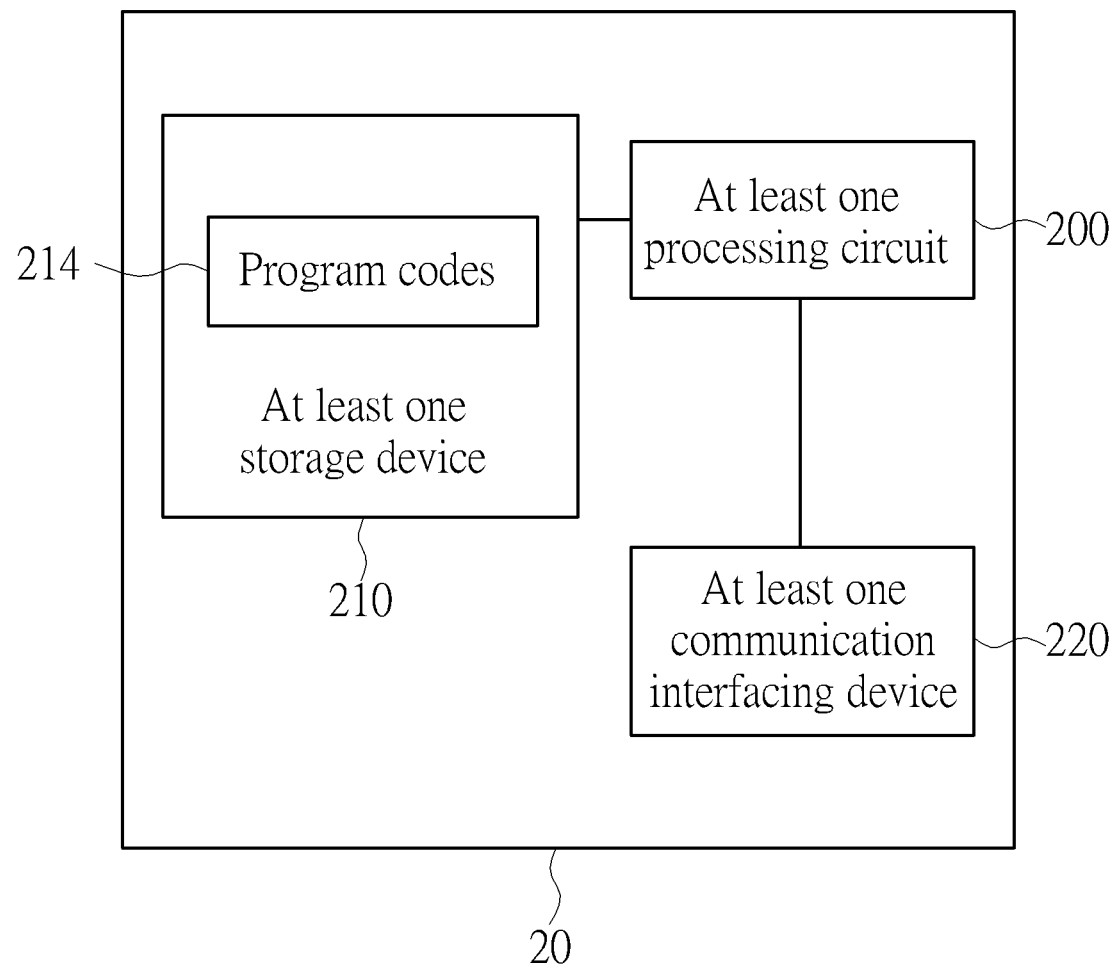
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used to represent a communication device in FIG. 1, to simplify the illustration of the examples.

Figure 3:
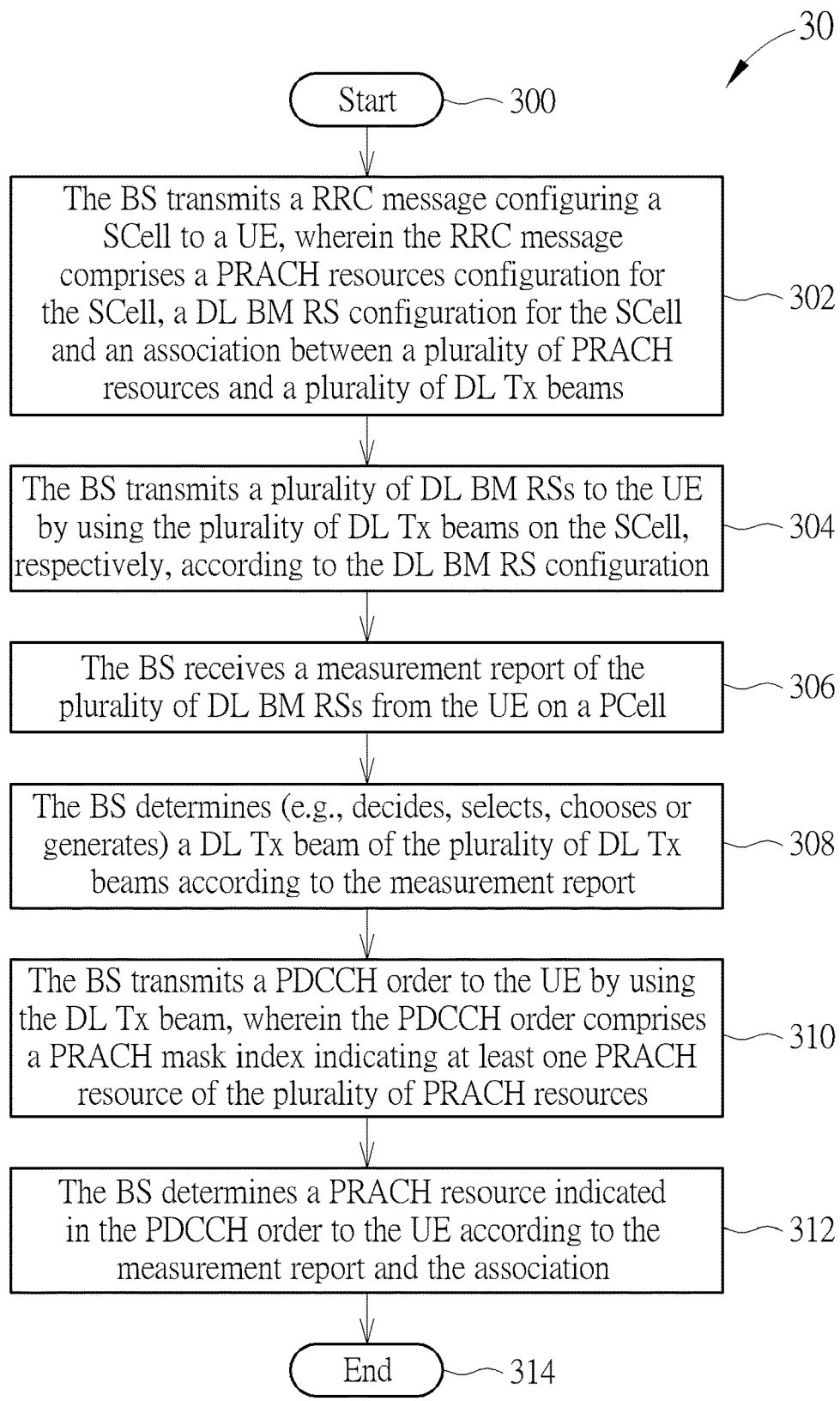
FIG. 3 is a flowchart of a process according to an example of the present invention.

A process 30 in FIG. 3 is utilized in a BS in a network shown in FIG. 1, and includes the following steps:

Step 300: Start.

Step 302: The BS transmits a radio resource control (RRC) message configuring a secondary cell (SCell) to a UE, wherein the RRC message comprises a PRACH resources configuration for the SCell, a downlink (DL) beam management (BM) reference signal (RS) configuration for the SCell and an association between a plurality of PRACH resources and a plurality of DL transmission (Tx) beams.

Step 304: The BS transmits a plurality of DL BM RSs to the UE by using the plurality of DL Tx beams on the SCell, respectively, according to the DL BM RS configuration.

Step 306: The BS receives a measurement report of the plurality of DL BM RSs from the UE on a primary cell (PCell).

Step 308: The BS determines (e.g., decides, selects, chooses or generates) a DL Tx beam of the plurality of DL Tx beams according to the measurement report.

Step 310: The BS transmits a Physical DL Control Channel (PDCCH) order to the UE by using the DL Tx beam, wherein the PDCCH order comprises a PRACH mask index indicating at least one PRACH resource of the plurality of PRACH resources.

Step 312: The BS determines a PRACH resource indicated in the PDCCH order to the UE according to the measurement report and the association.

Step 314: End.

In one example, the plurality of DL BM RSs include (e.g., are) a plurality of channel status information reference signals (CSI-RSs), and the DL BM RS configuration includes (e.g., is) a configuration of the plurality of CSI-RSs. In one example, the plurality of DL BM RSs include a plurality of synchronization signal blocks (SSBs), and the DL BM RS configuration includes a configuration of the plurality of SSBs.

In one example, the association indicates that a plurality of CSI-RS indices correspond to the plurality of PRACH resources, respectively. In one example, the association indicates that a plurality of SSB indices correspond to the plurality of PRACH resources, respectively.

In one example, the BS configures the PCell for receiving the measurement report. The BS may include (e.g., indicate) a UL control resource in the RRC message to the UE, and may transmit an activation message to the UE to activate the SCell. If the BS indicates the UL control resource and transmits the activation message, the BS expects and receives the measurement report from the UE on the UL control resource. If the BS indicates the UL control resource and does not transmit the activation message, the BS receives the measurement report on the UL control resource from the UE after transmitting the RRC message. In one example, the BS indexes the plurality of DL BM RSs, and receives a plurality of DL BM RS indices with associated quality assessments. For example, the BS receives a plurality of CSI-RS indices associated to Channel Quality Indicators (CQIs) and/or Reference Signal Receiving Powers (RSRPs) transmitted by the UE on a Physical UL Control Channel (PUCCH) resource configured in the RRC message.

In one example, the BS includes (e.g., indicates) a preamble format for the SCell in the RRC message. In one example, the BS includes a capability of beam correspondence on the SCell in the RRC message. In one example, the BS indicates the capability via an explicit bit field in the RRC message. In one example, the BS implicitly conveys information via the preamble format. For example, the preamble format compatible with a UL reception (Rx) beam sweeping operation implies lack of beam correspondence of the BS on the SCell.

In one example, the BS transmits the PDCCH order to the UE by using each of the plurality of DL Tx beams. That is, the BS performs a DL Tx beam sweeping. The PDCCH order may be a DL control message. In one example, the BS determines (e.g., decides to use) the DL Tx beam of the plurality of DL Tx beams, if a beam quality of the DL Tx beam is the best beam quality. In one example, the BS determines the DL Tx beam of the plurality of DL Tx beams, if the beam quality of the DL Tx beam is greater than a threshold. The threshold may be predetermined by the BS.

In one example, the PDCCH order includes a preamble sequence index indicating a preamble sequence. The preamble sequence may be included in the DL control message. In one example, the PDCCH order includes the PRACH mask index (i.e., a PRACH resource index) indicating the PRACH resource. The PRACH resource may be included in the DL control message.

In one example, the BS determines a plurality of UL Rx beams for receiving UL data on the plurality of PRACH resources, respectively. That is, the plurality of UL Rx beams correspond to the plurality of PRACH resources, respectively. In one example, the PRACH resource corresponds to a UL Rx beam which has the same spatial direction as that of the DL Tx beam. In one example, the BS detects the preamble sequence on the PRACH resource indicated (by the PRACH mask index) in the PDCCH order to the UE by using the UL Rx beam.

In one example, the BS determines the PRACH resource indicated (by the PRACH mask index) in the PDCCH order to the UE according to a resource utilization loading. In one example, the BS includes (e.g., indicates) a preamble format supporting a UL Rx beam sweeping in the RRC message. The BS receives a preamble from the UE on the PRACH resource by using each of the plurality of UL Rx beams. That is, the BS performs the UL Rx beam sweeping. In one example, the BS determines a UL Rx beam of the plurality of UL Rx beams on which the BS successfully detects the preamble transmitted by the UE. In one example, the BS determines the UL Rx beam of the plurality of UL Rx beams on which the BS has the best detection result, e.g., a highest correlation value, for the preamble transmitted by the UE over the plurality of UL Rx beams. In one example, the BS detects the preamble transmitted by the UE on each of the plurality of PRACH resources by using the plurality of UL Rx beams. In one example, the BS determines a UL Rx beam which has the same spatial direction as that of the DL Tx beam, and detects the preamble on the PRACH resource indicated (by the PRACH mask index) in the PDCCH order to the UE by using the UL Rx beam.

In one example, the BS obtains a timing advance (TA) estimation, after successfully detecting the preamble sequence (or the preamble). The TA estimation may be an estimate of a distance from the UE or an estimate of a signal propagation time from the UE. In one example, the BS adjusts a UL transmission timing of the UE according to the TA estimation, to align a UL transmission.

Figure 4:
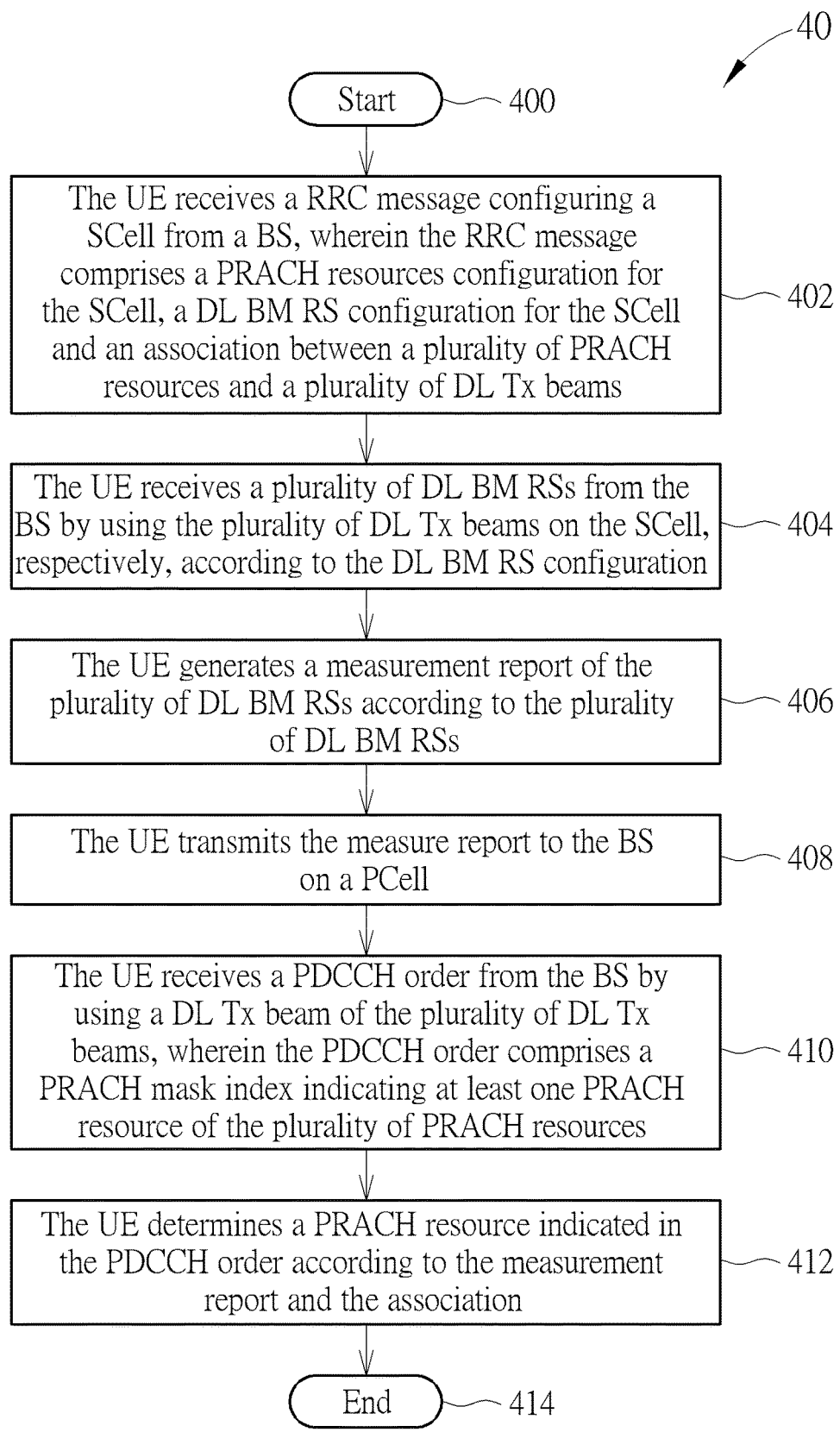
FIG. 4 is a flowchart of a process according to an example of the present invention.

A process 40 in FIG. 4 is utilized in a UE, and includes the following steps:

Step 400: Start.

Step 402: The UE receives a RRC message configuring a SCell from a BS, wherein the RRC message comprises a PRACH resources configuration for the SCell, a DL BM RS configuration for the SCell and an association between a plurality of PRACH resources and a plurality of DL Tx beams.

Step 404: The UE receives a plurality of DL BM RSs from the BS by using the plurality of DL Tx beams on the SCell, respectively, according to the DL BM RS configuration.

Step 406: The UE generates a measurement report of the plurality of DL BM RSs according to the plurality of DL BM RSs.

Step 408: The UE transmits the measure report to the BS on a PCell.

Step 410: The UE receives a PDCCH order from the BS by using a DL Tx beam of the plurality of DL Tx beams, wherein the PDCCH order comprises a PRACH mask index indicating at least one PRACH resource of the plurality of PRACH resources.

Step 412: The UE determines a PRACH resource indicated in the PDCCH order according to the measurement report and the association.

Step 414: End.

In one example, the plurality of DL BM RSs include (e.g., are) a plurality of CSI-RSs, and the DL BM RS configuration includes (e.g., is) a configuration of the plurality of CSI-RSs. In one example, the plurality of DL BM RSs include a plurality of SSBs, and the DL BM RS configuration includes a configuration of the plurality of SSBs.

In one example, the UE receives the RRC message indicating a UL control resource from the BS, and transmits the measurement report to the BS on the UL control resource. In one example, the UE measures qualities of CQI(s) and/or RSRP(s) of the plurality of CSI-RSs (or the plurality of SSBs), and transmits a measurement report of the CQI(s) and/or RSRP(s) of the plurality of CSI-RSs (or the plurality of SSBs) to the BS on a PUCCH resource configured in the RRC message. In one example, the UE transmits the measurement report of the plurality of DL BM RSs to the BS, after receiving an activation message for the SCell from the BS. In one example, the UE does not transmit the measurement report of the plurality of DL BM RSs to the BS.

In one example, the UE receives a preamble format for the SCell in the RRC message from the BS. In one example, the UE receives a capability of beam correspondence on the SCell in the RRC message from the BS. In one example, the UE obtains the capability via an explicit bit field in the RRC message. In one example, the UE implicitly obtains information via the preamble format. For example, the preamble format compatible with a UL Rx beam sweeping operation implies lack of beam correspondence of the BS on the SCell.

In one example, the UE receives the PDCCH order from the BS for triggering a transmission of a preamble sequence (or a preamble). The PDCCH order may be a DL control message. In one example, the UE blindly detects the PDCCH order in a plurality of DL control regions, wherein the plurality of DL control regions correspond to the plurality of DL Tx beams, respectively. In one example, the UE blindly detects the PDCCH order in a DL control region correspond to the DL Tx beam, after determining the DL Tx beam according to the measurement report.

In one example, the UE receives a preamble sequence index indicating the preamble sequence in the PDCCH order (or in the DL control message) from the BS. In one example, the UE receives the PRACH mask index (i.e., a PRACH resource index) indicating the PRACH resource in the PDCCH order (or in the DL control message) from the BS. In one example, the UE determines (e.g., decides to use) the DL Tx beam of the plurality of DL Tx beams, if a beam quality of the DL Tx beam is the best beam quality, e.g., the highest CQI and/or RSRP. The UE determines the PRACH resource corresponding to the DL Tx beam. In one example, the UE transmits the preamble sequence (or the preamble) on the PRACH resource to the BS by using a UL Rx beam according to the preamble format.

Figure 5:
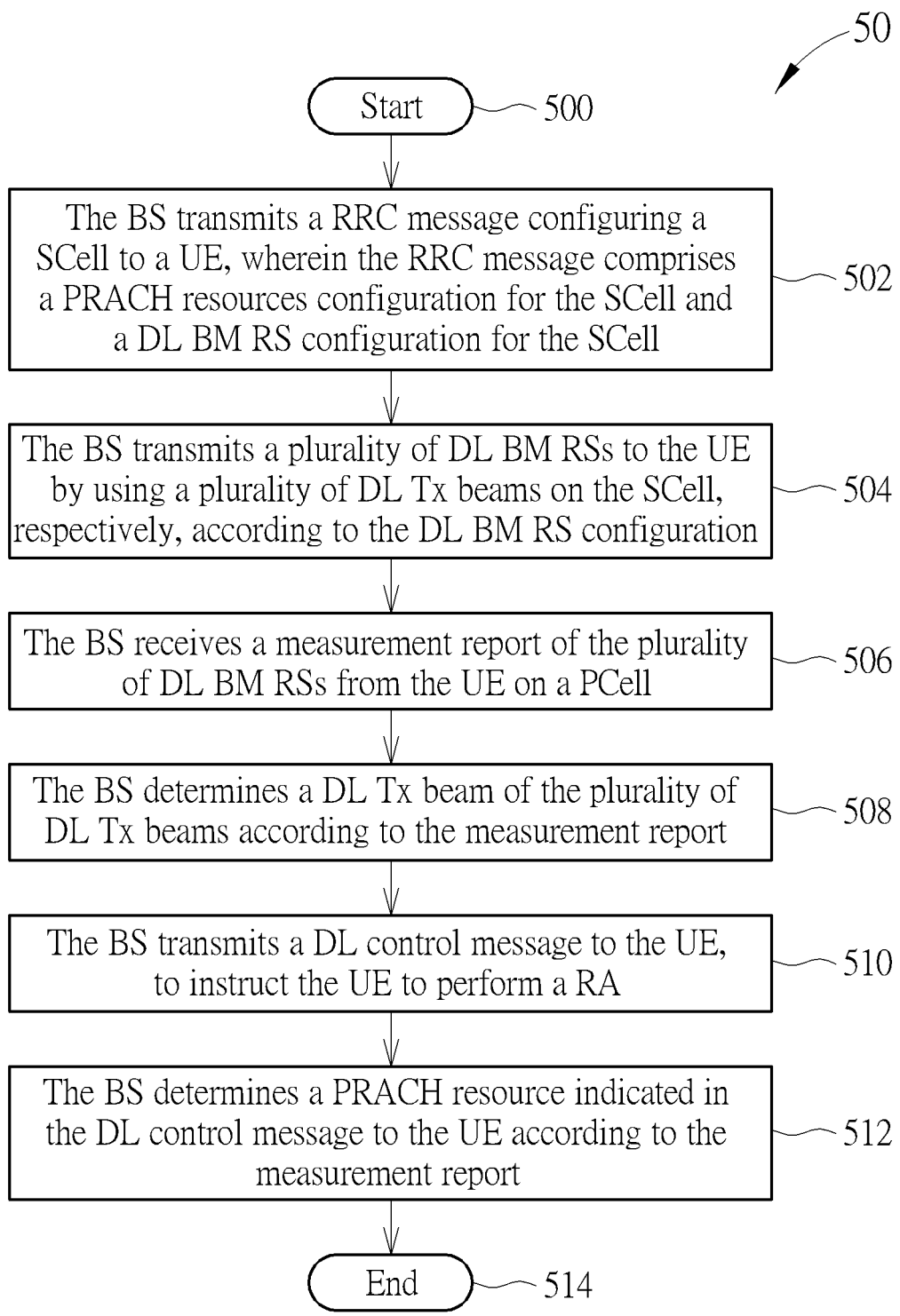
FIG. 5 is a flowchart of a process according to an example of the present invention.

A process 50 in FIG. 5 is utilized in a BS in a network shown in FIG. 1, and includes the following steps:

Step 500: Start.

Step 502: The BS transmits a RRC message configuring a SCell to a UE, wherein the RRC message comprises a PRACH resources configuration for the SCell and a DL BM RS configuration for the SCell.

Step 504: The BS transmits a plurality of DL BM RSs to the UE by using a plurality of DL Tx beams on the SCell, respectively, according to the DL BM RS configuration.

Step 506: The BS receives a measurement report of the plurality of DL BM RSs from the UE on a PCell.

Step 508: The BS determines a DL Tx beam of the plurality of DL Tx beams according to the measurement report.

Step 510: The BS transmits a DL control message to the UE, to instruct the UE to perform a random access (RA).

Step 512: The BS determines a PRACH resource indicated in the DL control message to the UE according to the measurement report.

Step 514: End.

In one example, the plurality of DL BM RSs include (e.g., are) a plurality of CSI-RSs, and the DL BM RS configuration includes (e.g., is) a configuration of the plurality of CSI-RSs. In one example, the plurality of DL BM RSs include a plurality of SSBs, and the DL BM RS configuration includes a configuration of the plurality of SSBs.

In one example, the BS configures the PCell for receiving the measurement report. The BS may include (e.g., indicate) a UL control resource in the RRC message to the UE, and may transmit an activation message to the UE to activate the SCell. If the BS indicates the UL control resource and transmits the activation message, the BS expects and receives the measurement report from the UE on the UL control resource. If the BS indicates the UL control resource and does not transmit the activation message, the BS receives the measurement report on the UL control resource from the UE after transmitting the RRC message. In one example, the BS indexes the plurality of DL BM RSs, and receives a plurality of DL BM RS indices with associated quality assessments. For example, the BS receives a plurality of CSI-RS indices associated to CQIs and/or RSRPs transmitted by the UE on a PUCCH resource configured in the RRC message.

In one example, the BS includes (e.g., indicates) a preamble format for the SCell in the RRC message. In one example, the BS includes a capability of beam correspondence on the SCell in the RRC message. In one example, the BS indicates the capability via an explicit bit field in the RRC message. In one example, the BS implicitly conveys information via the preamble format. For example, the preamble format compatible with a UL Rx beam sweeping operation implies lack of beam correspondence of the BS on the SCell.

In one example, the BS transmits the DL control message to the UE on a PDCCH. In this case, the DL control message may be a PDCCH order. In one example, the DL control message is a Medium Access Control (MAC) control element. In one example, the BS transmits the DL control message by using each of the plurality of DL Tx beams. That is, the BS performs a DL Tx beam sweeping. In one example, the BS determines (e.g., decides to use) the DL Tx beam of the plurality of DL Tx beams, if a beam quality of the DL Tx beam is the best beam quality. In one example, the BS determines the DL Tx beam of the plurality of DL Tx beams, if the beam quality of the DL Tx beam is greater than a threshold. The threshold may be predetermined by the BS.

In one example, the DL control message includes a preamble sequence index indicating a preamble sequence. In one example, the DL control message includes a PRACH mask index (i.e., a PRACH resource index) indicating at least one PRACH resource including the PRACH resource.

In one example, the BS determines a plurality of UL Rx beams for receiving UL data on the plurality of PRACH resources, respectively. That is, the plurality of UL Rx beams correspond to the plurality of PRACH resources, respectively. In one example, the PRACH resource corresponds to a UL Rx beam which has the same spatial direction as that of the DL Tx beam. In one example, the BS detects the preamble sequence on the PRACH resource indicated (by the PRACH mask index) in the DL control message to the UE by using the UL Rx beam.

In one example, the BS determines the PRACH resource indicated (by the PRACH mask index) in the DL control message to the UE according to a resource utilization loading. In one example, the BS includes (e.g., indicates) a preamble format supporting a UL Rx beam sweeping in the RRC message. The BS receives a preamble from the UE on the PRACH resource by using each of the plurality of UL Rx beams. That is, the BS performs the UL Rx beam sweeping. In one example, the BS determines a UL Rx beam of the plurality of UL Rx beams on which the BS successfully detects the preamble transmitted by the UE. In one example, the BS determines the UL Rx beam of the plurality of UL Rx beams on which the BS has the best detection result, e.g., a highest correlation value, for the preamble transmitted by the UE over the plurality of UL Rx beams.

Figure 6:
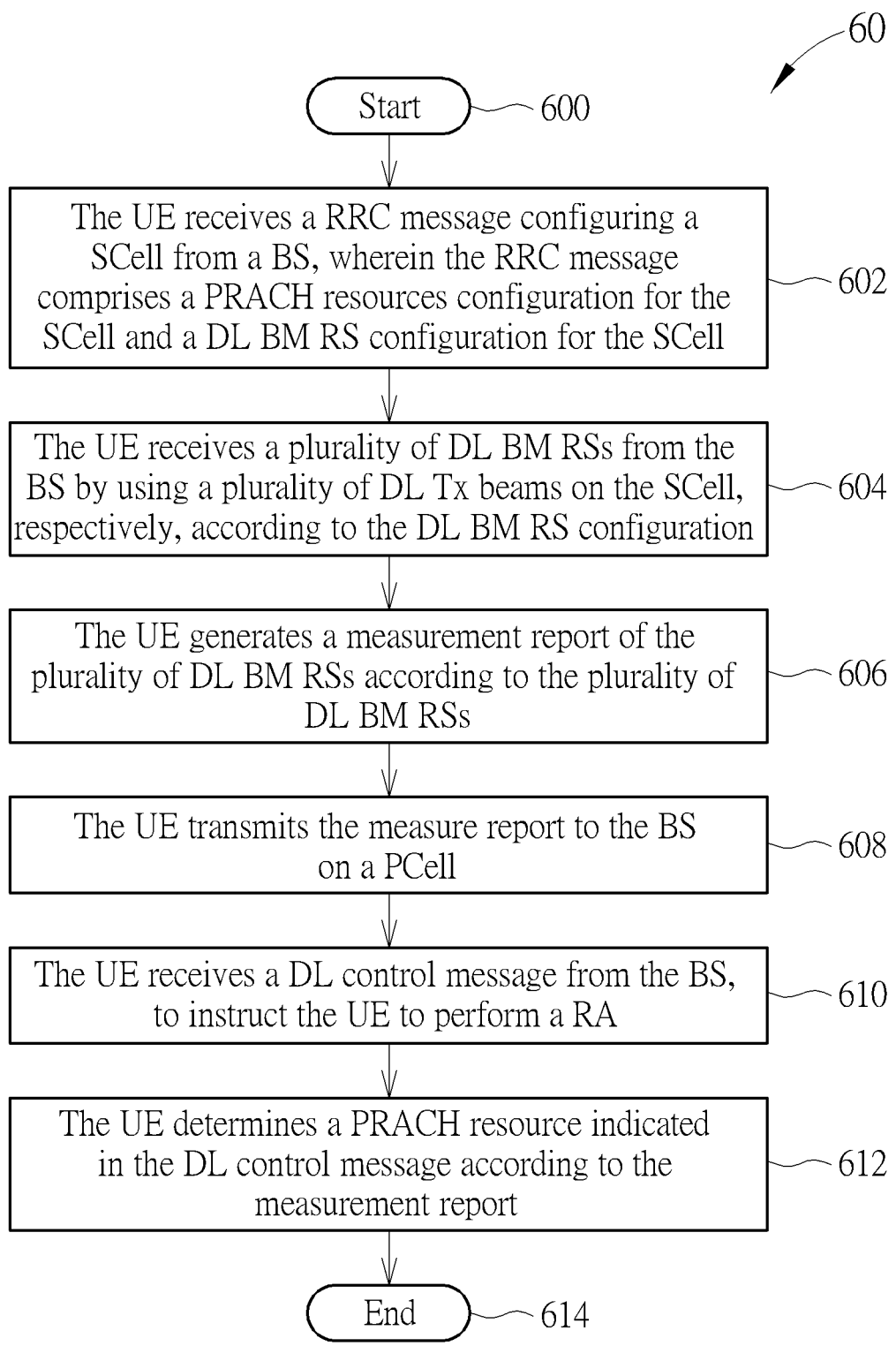
FIG. 6 is a flowchart of a process according to an example of the present invention.

A process 60 in FIG. 6 is utilized in a UE, and includes the following steps:

Step 600: Start.

Step 602: The UE receives a RRC message configuring a SCell from a BS, wherein the RRC message comprises a PRACH resources configuration for the SCell and a DL BM RS configuration for the SCell.

Step 604: The UE receives a plurality of DL BM RSs from the BS by using a plurality of DL Tx beams on the SCell, respectively, according to the DL BM RS configuration.

Step 606: The UE generates a measurement report of the plurality of DL BM RSs according to the plurality of DL BM RSs.

Step 608: The UE transmits the measure report to the BS on a PCell.

Step 610: The UE receives a DL control message from the BS, to instruct the UE to perform a RA.

Step 612: The UE determines a PRACH resource indicated in the DL control message according to the measurement report.

Step 614: End.

In one example, the plurality of DL BM RSs include (e.g., are) a plurality of CSI-RSs, and the DL BM RS configuration includes (e.g., is) a configuration of the plurality of CSI-RSs. In one example, the plurality of DL BM RSs include a plurality of SSBs, and the DL BM RS configuration includes a configuration of the plurality of SSBs.

In one example, the UE receives the RRC message indicating a UL control resource from the BS, and transmits the measurement report to the BS on the UL control resource. In one example, the UE measures qualities of CQI(s) and/or RSRP(s) of the plurality of CSI-RSs (or the plurality of SSBs), and transmits a measurement report of the CQI(s) and/or RSRP(s) of the plurality of CSI-RSs (or the plurality of SSBs) to the BS on a PUCCH resource configured in the RRC message. In one example, the UE transmits the measurement report of the plurality of DL BM RSs to the BS, after receiving an activation message for the SCell from the BS.

In one example, the UE receives a preamble format for the SCell in the RRC message from the BS. In one example, the UE receives a capability of beam correspondence on the SCell in the RRC message from the BS. In one example, the UE obtains the capability via an explicit bit field in the RRC message. In one example, the UE implicitly obtains information via the preamble format. For example, the preamble format compatible with a UL Rx beam sweeping operation implies lack of beam correspondence of the BS on the SCell.

In one example, the UE receives the DL control message from the BS for triggering a transmission of a preamble sequence (or a preamble). The DL control message may be a PDCCH order or a MAC control element. In one example, the UE blindly detects the DL control message in a plurality of DL control regions, wherein the plurality of DL control regions correspond to the plurality of DL Tx beams, respectively. In one example, the UE blindly detects the DL control message in a DL control region correspond to the DL Tx beam, after determining the DL Tx beam according to the measurement report.

In one example, the UE receives a preamble sequence index indicating the preamble sequence in the DL control message from the BS. In one example, the UE receives a PRACH mask index (i.e., a PRACH resource index) indicating at least one PRACH resource including the PRACH resource in the DL control message from the BS. In one example, the UE transmits the preamble sequence (or the preamble) on the PRACH resource to the BS by using a UL Rx beam according to the preamble format.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for handling PRACH resources on a SCell in CA. A BS or the UE determines a PRACH resource according to qualities of a plurality of DL Tx beams. Thus, the problem how to determine the PRACH resource on a SCell for the UE in a NR system is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A base station (BS) For handling Physical Random Access Channel (PRACH) resources on a secondary cell (SCell) for a user equipment (UE) in carrier aggregation (CA), comprising: at least one storage device; and at least one processing circuit, coupled to the at least one storage device, wherein the at least one storage device stores, and the at least one processing circuit is configured to execute instructions of: transmitting a radio resource control (RRC) message configuring the SCell to the UE, wherein the RRC message comprises a PRACH resources configuration for the SCell, a downlink (DL) beam management (BM) reference signal (RS) configuration for the SCell and an association between a plurality of PRACH resources and a plurality of DL transmission (Tx) beams;
   transmitting a plurality of DL BM RSs to the UE by using the plurality of DL Tx beams on the SCell, respectively, according to the DL BM RS configuration;
   receiving a measurement report of the plurality of DL BM RSs from the UE on a primary cell (PCell); determining a DL Tx beam of the plurality of DL Tx beams according to the measurement report;
   transmitting a Physical DL Control Channel (PDCCH) order to the UE by using the DL Tx beam, wherein the PDCCH order comprises a PRACH mask index indicating at least one PRACH resource of the plurality of PRACH resources; and
   determining a PRACH resource indicated in the PDCCH order to the UE according to the measurement report and the association.

2. The BS of claim 1, wherein the plurality of DL BM RSs comprise a plurality of channel status information reference signals (CSI-RSs) or a plurality of synchronization signal blocks (SSBs).

3. The BS of claim 1, wherein the instructions further comprise:
   comprising a preamble format for the SCell in the RRC message.

4. The BS of claim 1, wherein the instructions further comprise: transmitting the PDCCH order to the UE by using each of the plurality of DL Tx beams.

5. The BS of claim 1, wherein the instructions further comprise:
   determining the DL Tx beam of the plurality of DL Tx beams, if a beam quality of the DL Tx beam is the best beam quality; or
   determining the DL Tx beam of the plurality of DL Tx beams, if the beam quality of the DL Tx beam is greater than a threshold.

6. The BS of claim 1, wherein the PDCCH order comprises a preamble sequence index indicating a preamble sequence.

7. The BS of claim 1, wherein the PRACH resource corresponds to a uplink (UL) reception (Rx) beam which has the same spatial direction as that of the DL Tx beam.

8. The BS of claim 1, wherein the instructions further comprise:
   detecting a preamble sequence on the PRACH resource indicated in the PDCCH order by using a UL Rx beam; and
   obtaining a timing advance (TA) estimation, after detecting the preamble sequence.

9. The BS of claim 1, wherein the instructions further comprise:
   determining the PRACH resource indicated in the PDCCH order according to a resource utilization loading.

10. A User Equipment (UE) for handling Physical Random Access Channel (PRACH) resources on a secondary cell (SCell) for the UE in carrier aggregation (CA), comprising: at least one storage device; and at least one processing circuit, coupled to the at least one storage device, wherein the at least one storage device stores, and the at least one processing circuit is configured to execute instructions of:
    receiving a radio resource control (RRC) message configuring the SCell from a base station (BS), wherein the RRC message comprises a PRACH resources configuration for the SCell, a downlink (DL) beam management (BM) reference signal (RS) configuration for the SCell and an association between a plurality of PRACH resources and a plurality of DL transmission (Tx) beams;
    receiving a plurality of DL BM RSs from the BS by using the plurality of DL Tx beams on the SCell, respectively, according to the DL BM RS configuration;
    generating a measurement report of the plurality of DL BM RSs according to the plurality of DL BM RSs;
    transmitting the measure report to the BS on a primary cell (PCell);
    receiving a Physical DL Control Channel (PDCCH) order from the BS by using a DL Tx beam of the plurality of DL Tx beams, wherein the PDCCH order comprises a PRACH mask index indicating at least one PRACH resource of the plurality of PRACH resources; and
    determining a PRACH resource indicated in the PDCCH order according to the measurement report and the association.

11. The UE of claim 10, wherein the plurality of DL BM RSs comprise a plurality of channel status information reference signals (CSI-RSs) or a plurality of synchronization signal blocks (SSBs).

12. The UE of claim 10, wherein the instructions further comprise: receiving a preamble format for the SCell in the RRC message from the BS; and transmitting a preamble sequence on the PRACH resource to the BS by using an uplink (UL) reception (Rx) beam according to the preamble format.

13. The UE of claim 10, wherein the instructions further comprise: detecting the PDCCH order in a plurality of DL control regions, wherein the plurality of DL control regions correspond to the plurality of DL Tx beams, respectively.

14. The UE of claim 10, wherein the PDCCH order comprises a preamble sequence index indicating a preamble sequence.

* * * * *